(12) United States Patent
Bailey

(10) Patent No.: US 10,870,486 B2
(45) Date of Patent: Dec. 22, 2020

(54) DIAMOND QUADCOPTER

(71) Applicant: Stephen Lee Bailey, Los Gatos, CA (US)

(72) Inventor: Stephen Lee Bailey, Los Gatos, CA (US)

(*) Notice: Subject to any disclaimer, the term of this patent is extended or adjusted under 35 U.S.C. 154(b) by 324 days.

(21) Appl. No.: 16/134,509

(22) Filed: Sep. 18, 2018

(65) Prior Publication Data

US 2019/0092445 A1    Mar. 28, 2019

Related U.S. Application Data

(60) Provisional application No. 62/561,682, filed on Sep. 22, 2017.

(51) Int. Cl.
*B64C 29/00* (2006.01)
*B64C 1/14* (2006.01)
*B64C 1/00* (2006.01)
*B64C 11/00* (2006.01)

(52) U.S. Cl.
CPC ........ *B64C 29/0033* (2013.01); *B64C 1/0009* (2013.01); *B64C 1/1415* (2013.01); *B64C 11/001* (2013.01); *B64C 2001/0045* (2013.01)

(58) Field of Classification Search
CPC ... B64C 1/1415; B64C 1/22; B64C 2025/008; B64C 29/0033
See application file for complete search history.

(56) References Cited

U.S. PATENT DOCUMENTS

| | | | |
|---|---|---|---|
| 1,775,861 A | 9/1930 | Lehberger |
| 3,065,929 A | 1/1962 | Holland |
| 3,184,181 A | 5/1965 | Kaplan |
| 3,360,217 A | 12/1967 | Trotter |
| 4,149,688 A | 4/1979 | Miller |
| 5,115,996 A | 5/1992 | Moller |
| 5,250,950 A | 10/1993 | Scherrer |
| 6,264,136 B1 | 7/2001 | Weston |

(Continued)

OTHER PUBLICATIONS

Wainfan, B., Feasibility Study of the Low Aspect Ratio All-Lifting Configuration as a Low Cost Personal Aircraft, NASA LARC NAG-1-03054, Feb. 1, 2004, NASA Langley, Hampton, Virginia, USA.

(Continued)

*Primary Examiner* — Joseph W Sanderson

(57) ABSTRACT

A diamond quadcopter is described with tilting propulsion modules attached to a diamond faceted fuselage providing vertical thrust for Vertical Takeoff and Landing (VTOL) and transitioning to horizontal thrust for flight. The diamond faceted fuselage generates lift as a low aspect ratio lifting body. The diamond-like facet geometry enables propulsor placement to minimize interaction between the slipstream and fuselage in all modes of operation. A retractable landing gear with powered wheels allows Vertical/Short Takeoff and Landing (V/STOL) including emergency landings, and maneuverability on the ground. Landed and with gear retracted the bottom fuselage facet is close to ground level allowing an aft facet ramp for walk-on or roll-on access of passengers and payload. With the landing gear extended the vehicle can maneuver over cargo using the wheeled hub motors and then retract for insertion of cargo through a fuselage bottom door.

1 Claim, 7 Drawing Sheets

150 Bottom Door

10 Diamond Quadcopter

(56) References Cited

U.S. PATENT DOCUMENTS

| | | | |
|---|---|---|---|
| 6,655,631 B2 | 12/2003 | Austen-Brown | |
| 7,472,863 B2 * | 1/2009 | Pak | A63H 27/14 |
| | | | 244/12.5 |
| 7,806,362 B2 * | 10/2010 | Yoeli | B64C 29/0025 |
| | | | 244/23 A |
| 7,874,513 B1 * | 1/2011 | Smith | B64C 29/0033 |
| | | | 244/12.4 |
| 8,453,962 B2 * | 6/2013 | Shaw | B64C 27/28 |
| | | | 244/17.23 |
| 8,708,282 B2 * | 4/2014 | Helou, Jr. | B64C 1/22 |
| | | | 244/137.1 |
| 9,108,720 B2 * | 8/2015 | Helou, Jr. | B64C 39/02 |
| 9,139,283 B1 * | 9/2015 | Campbell | B64D 9/003 |
| 9,205,910 B1 * | 12/2015 | Campbell | B64C 39/02 |
| 9,611,039 B2 * | 4/2017 | Lieven | B64C 1/00 |
| 10,384,773 B2 * | 8/2019 | Vondrell | B64D 27/24 |
| 10,384,774 B2 * | 8/2019 | Vondrell | H02J 7/0042 |
| 10,392,106 B2 * | 8/2019 | Vondrell | B64D 27/12 |
| 10,583,922 B1 * | 3/2020 | Boyes | B64D 43/00 |
| 10,647,404 B2 * | 5/2020 | Sugaki | B64C 27/30 |
| 2007/0246601 A1 | 10/2007 | Layton | |
| 2009/0008499 A1 * | 1/2009 | Shaw | B64C 27/08 |
| | | | 244/17.23 |
| 2011/0001020 A1 | 1/2011 | Forgac | |
| 2012/0234968 A1 * | 9/2012 | Smith | B64D 17/64 |
| | | | 244/12.3 |
| 2019/0047342 A1 * | 2/2019 | Dietrich | B64C 39/024 |
| 2019/0112025 A1 * | 4/2019 | Sugaki | B64C 1/063 |
| 2019/0202563 A1 * | 7/2019 | Wiggerich | B64C 1/22 |
| 2020/0079503 A1 * | 3/2020 | Bailey | B64C 25/36 |

OTHER PUBLICATIONS

Miller, J., Chapter 26 the Bell Aerospace Textron X-22A, The X-Planes, 1988, p. 156-171, Aerofax Publishing, Arlington, Texas, USA.

* cited by examiner

10 Diamond Quadcopter

150 Bottom Door

10 Diamond Quadcopter

DIAMOND QUADCOPTER

CROSS-REFERENCE TO RELATED APPLICATIONS

This application claims the benefit of provisional patent application 62/561,682 filed 2017, Sep. 22 by the present inventor.

FEDERALLY SPONSORED RESEARCH

None.

SEQUENCE LISTING

None.

BACKGROUND

A quadcopter is a Vertical Takeoff and Landing (VTOL) aerial vehicle consisting of a fuselage surrounded by four independent, vertical axis propulsory. By varying the distribution of speed and power to the propulsion modules, forward controlled flight is possible. The quadcopter propulsion modules continuously provide the thrust to both lift the craft and then generate forward motion. The propulsion modules may or may not have the capability to tilt in the fore and aft direction. For the quadcopter with propulsion modules that tilt, more thrust is available for forward motion with an adjustable flight trim.

The typical quadcopter design consists of a fuselage designed to reduce drag but not to provide significant lift. Because all of the lift is provided by the propulsion, the energy expended to offset the vehicle weight reduces the available energy for flight range and duration. The fuselage provides limited space for equipment and there is poor access to the interior volume for loading of passengers or cargo due to the surrounding propulsion system. Many versions, from small to large size, are limited to carrying payload appended to the exterior of the fuselage. The appended payload is less desirable than having the access and volume to carrying it partially or fully within the fuselage since the payload is unprotected from the elements and adds aerodynamic drag.

The propulsion modules typically make up the four outer corners of the vehicle and have swept diameters outside the footprint of the fuselage in order to minimize slipstream interaction. This arrangement substantially reduces the available footprint for the fuselage for a given overall length and width.

Lastly, state-of-the-art quadcopters typically have fixed strut landing gear without wheels thus limiting the aerial vehicle to only a vertical takeoff and landing (VTOL) mode. Some versions have folding struts for a more compact stowage arrangement or to reduce aerodynamic drag in flight; however, wheels are typically not utilized for ground mobility or short takeoff and landing (STOL) capabilities.

Figure 1:
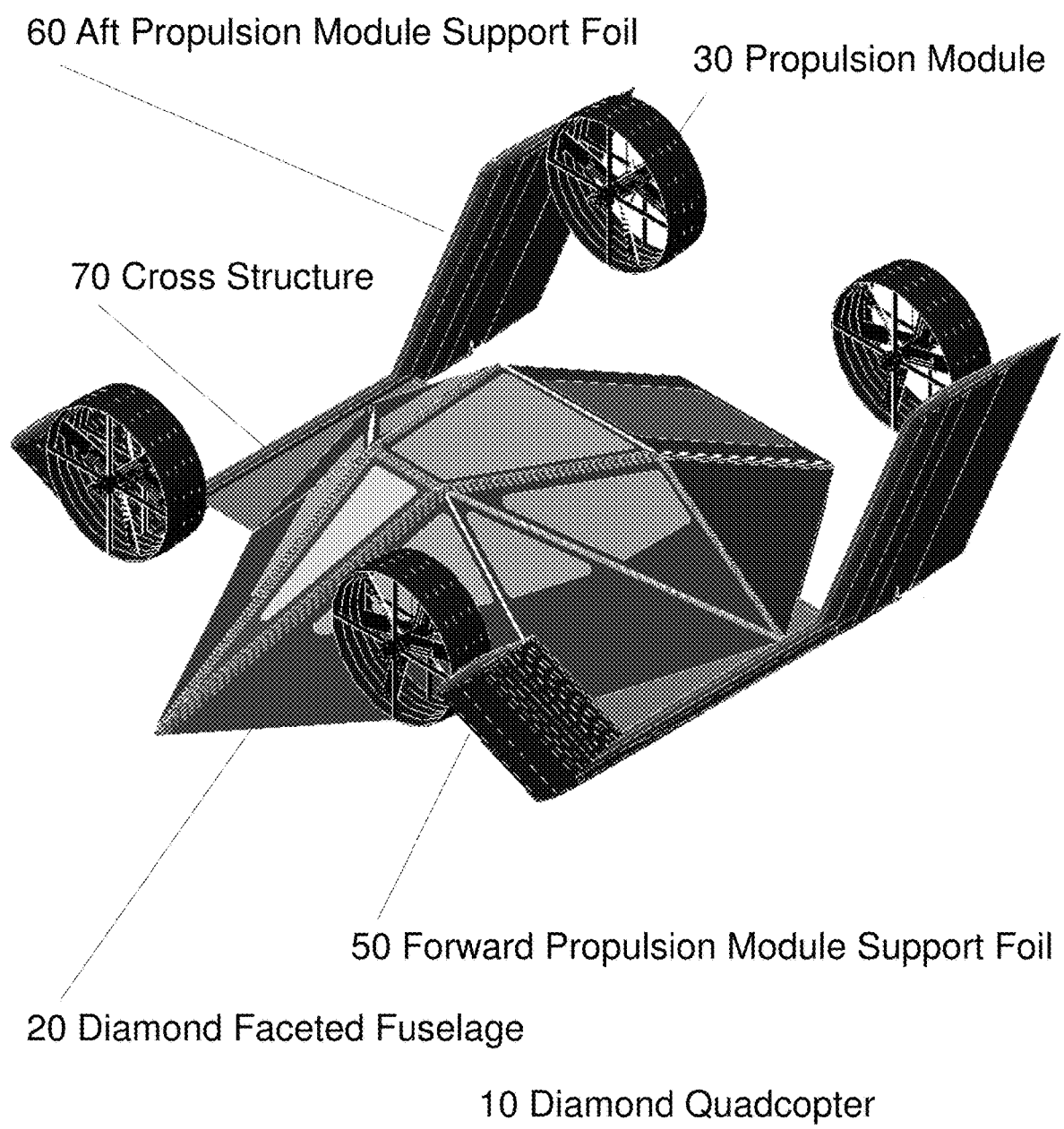
FIG. 1 is a Perspective View of the Diamond Quadcopter in Flight Mode Configuration.

REFERENCE NUMERALS 10 diamond quadcopter
20 diamond faceted fuselage
30 propulsion module
40 rotary actuator
50 forward propulsion module support foil
60 aft propulsion module support foil
70 cross structure
80 energy storage internal module
90 landing struts
100 caster nose wheel
110 main landing wheel
120 hub motor
130 ramp
140 hinge
150 bottom door
160 forward cross foil
170 aft cross foil

DETAILED DESCRIPTION—FIRST EMBODIMENT

A novel diamond quadcopter 10 is described that provides improvements in flight performance and payload utility. Said diamond quadcopter 10, illustrated in FIG. 1, incorporates a diamond faceted fuselage 20 that functions as a low aspect ratio lifting body for generating lift in forward flight. In the four corners of said diamond quadcopter 10, four propulsion modules 30 are mounted using rotary actuators 40 onto forward propulsion support foils 50 and aft propulsion module support foils 60 that connect through a cross structure 70 to said diamond faceted fuselage 20. Said aft propulsion module support foils 60 also function as vertical stabilizers to assist in yaw stability during flight and are large enough in lateral area to compensate for the yaw destabilization from said forward propulsion module support foils 50. Said propulsion modules 30 may incorporate open or ducted propellers; however, the ducted embodiment may provide increased vertical thrust, significant lift in forward flight, act as a safety barrier and reduce radiated noise when properly designed by those skilled in the art.

Figure 2:
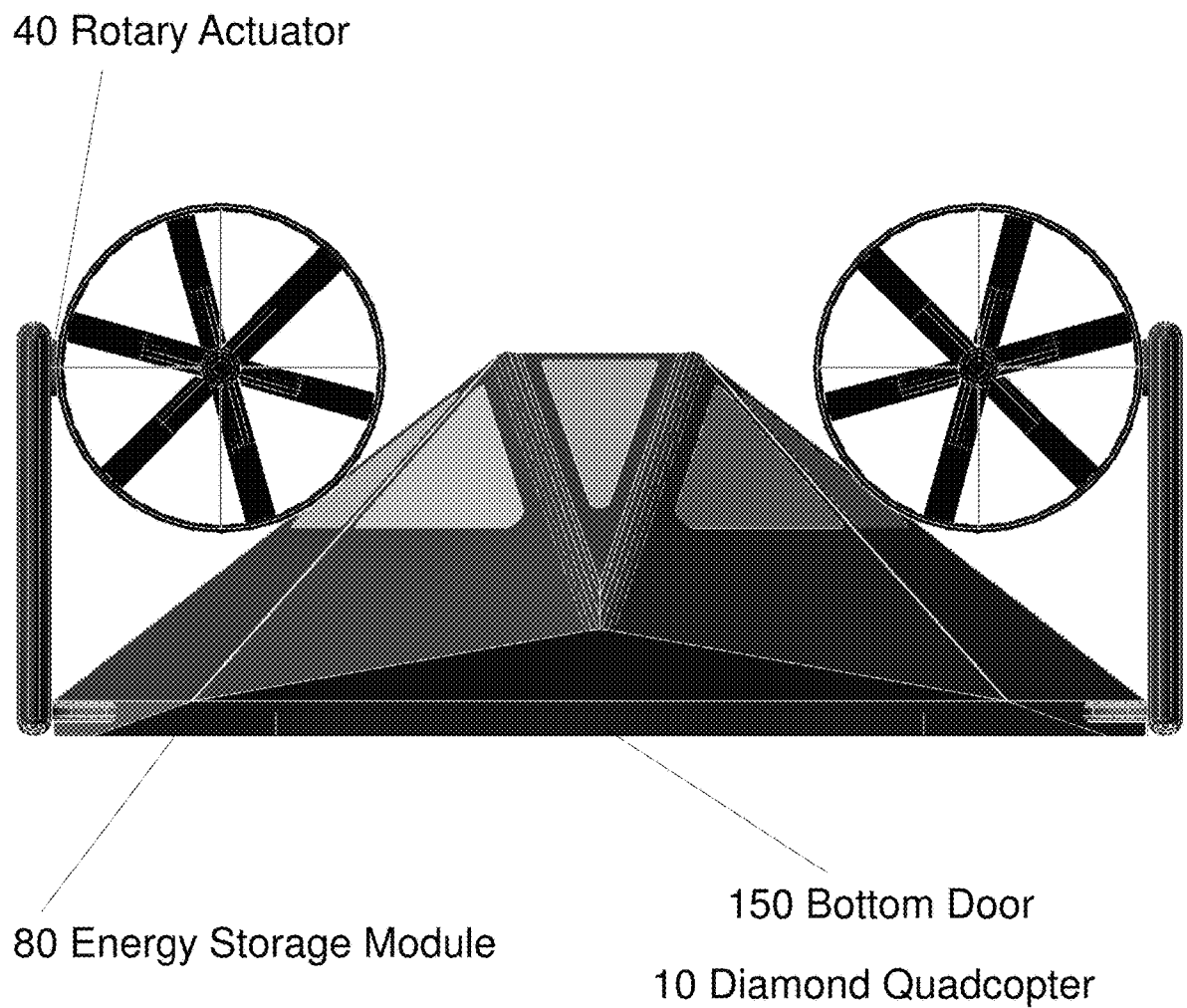
FIG. 2 is a Front View of the Diamond Quadcopter in Flight Mode Configuration.
Figure 3:
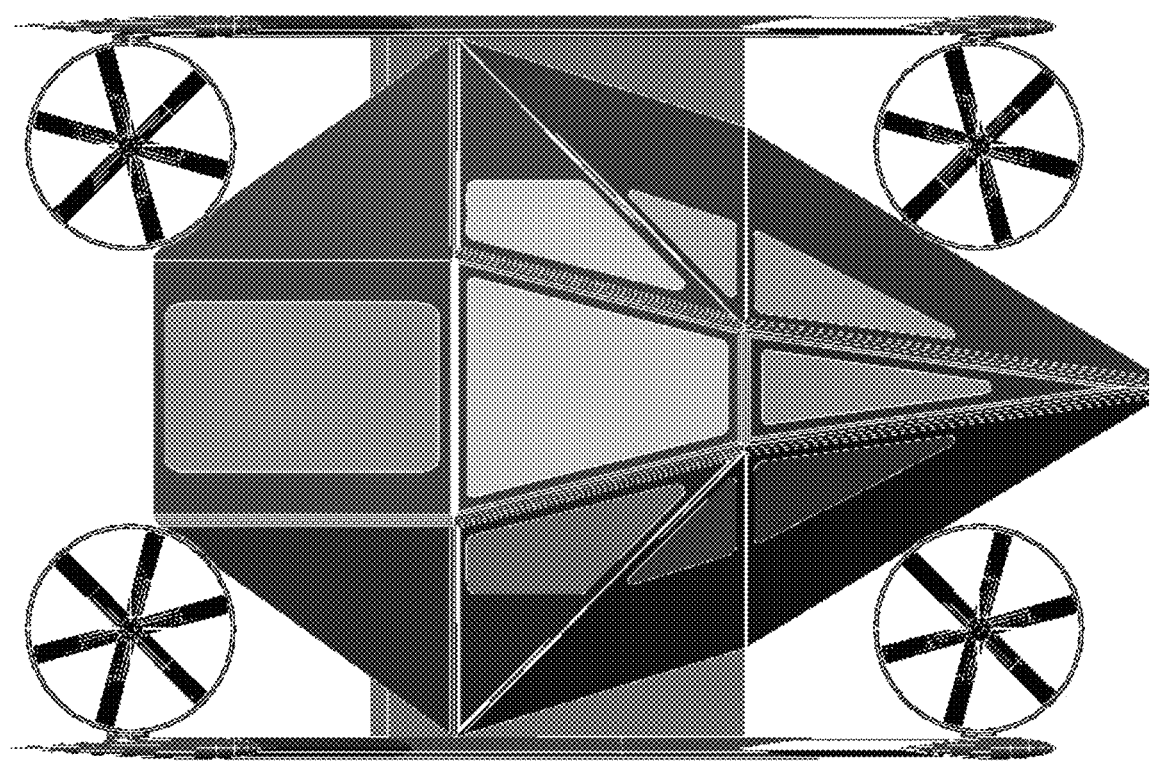
FIG. 3 is a Plan View Of The Diamond Quadcopter in Vertical Take-Off And Landing Mode Configuration.

Inherent to a quadcopter, said propulsive modules 30 are controlled by computers to provide flight attitude control and VTOL operation. As illustrated in FIG. 2, said forward propulsion module support foil 50 and said aft propulsion module support foil 60 are of sufficient height for said propulsion modules 30 to operate during forward flight on a horizontal axis without overlap with said diamond faceted fuselage 20 projected area to reduce negative slipstream interaction. As illustrated in FIG. 3, said forward propulsion module support foils 50 are swept forward and said aft propulsion module support foils 60 are swept aft to eliminate longitudinal or lateral overlap of said propulsion modules 30 with said diamond faceted fuselage 20 projected area to also reduce negative slipstream interaction during takeoff and landing.

As illustrated in FIG. 1, said quadcopter 10 incorporates a cross structure 70 which can be integral to or supportive of said diamond faceted fuselage 20 depending on the required level of structural and functional modularity. Said cross structure 70 has volume for energy storage internal modules 80 in the lateral regions, as illustrated in FIG. 2, for providing energy needed by said propulsion modules 30. Said energy storage internal module 80 may contain fuel tanks if said propulsion module 30 are powered directly or indirectly by engines or batteries if said propulsion module 30 are powered by motors.

Figure 4:
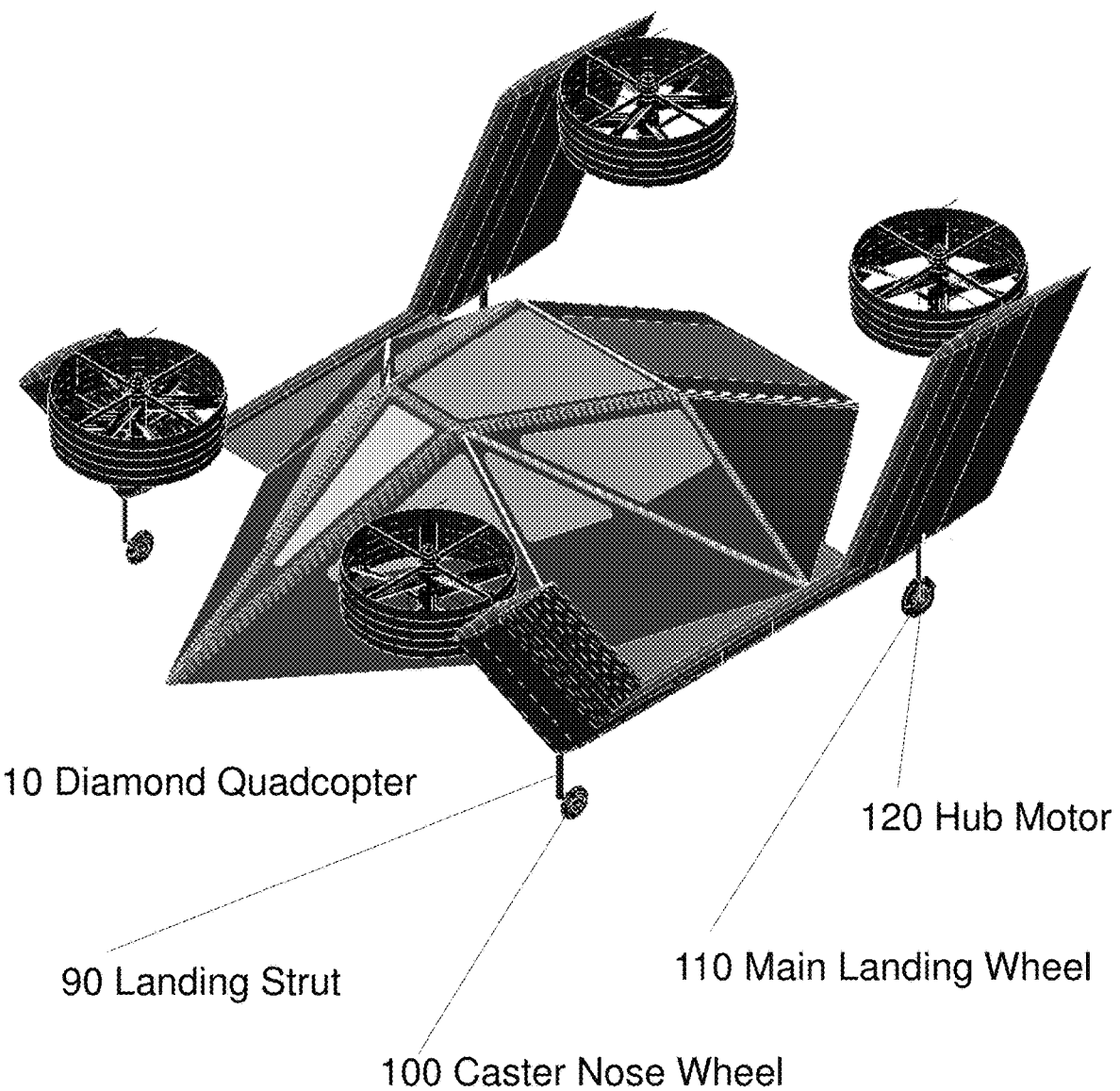
FIG. 4 is a Perspective View of the Diamond Quadcopter in Vertical Take-Off And Landing Mode and Ground Maneuvering Configuration.

Said forward propulsion module support foils 50 and said aft propulsion module support foils 60 may have, in an embodiment, internally mounted landing struts 90 illustrated in FIG. 4. Said landing struts 90 are linearly actuated independently to provide said diamond quadcopter 10 height and attitude control while on the ground, retract in flight, and to absorb shock during landing.

Said landing struts 90 have a caster nose wheel 100 mounted on one pair and have main landing wheels 110 mounted on a second pair. In an embodiment, said main landing wheel 110 may incorporate hub motors 120 for ground maneuvering. Collective or differential powering of said hub motor 120 in combination with said caster nose wheel 100 allows maneuverability on the ground without the use of said propulsion modules 30. Said hub motor 120 may also assist with power during short takeoff and with regenerative braking during a rolling landing.

OPERATION—FIRST EMBODIMENT

Said propulsive modules 30 are tilted by said rotary actuators 40 to transition from vertical thrust for take-off and landing mode to a more horizontal thrust during flight mode, as illustrated in FIG. 2. Said rotary actuators 40 are able to rotate greater than 90 degrees in order to vector the thrust in an aft direction for VTOL control or for slowing descent. The lift provided by said diamond faceted fuselage 20 improves the range over a conventional quadcopter while also providing for an optional STOL mode. The lift is an important attribute in the case of an emergency landing due to a malfunction in some portion of the propulsive system. Said diamond faceted fuselage 20 is a low aspect ratio lifting body able to generate lift while remaining stable at high angles of attack and low speeds.

DETAILED DESCRIPTION—SECOND EMBODIMENT

Figure 5:
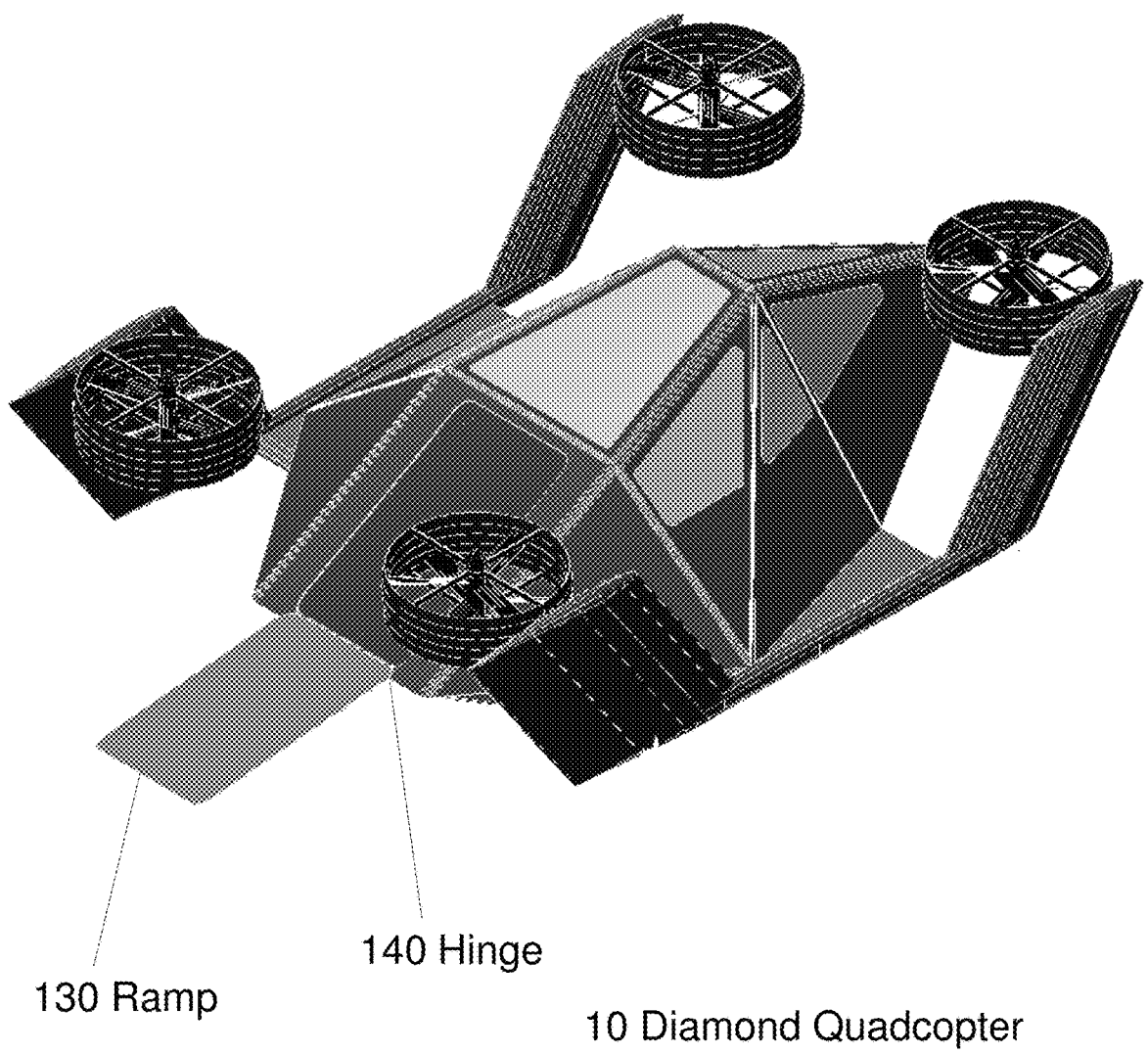
FIG. 5 is a Perspective View of the Diamond Quadcopter with the Landing Gear Retracted and Ramp Deployed for Roll-on or Walk-on Loading.

In a second embodiment illustrated in FIG. 5, said diamond faceted fuselage 20 incorporates a ramp 130 in its aft facing facet that has a hinge 140 along its lower edge for opening to load and unload passengers and cargo.

OPERATION—SECOND EMBODIMENT

With said landing struts 90 fully retracted the thin, flat shape of said cross structure 70 allows said hinge 140 to be in close proximity to the ground. The low height of said hinge 140 allows a very shallow angle for said ramp 130 for easy walk-on or roll-on of payload, for example passengers using wheelchairs or gurneys, and without the inconvenience of having to climb into a fuselage.

DETAILED DESCRIPTION—THIRD EMBODIMENT

Figure 6:
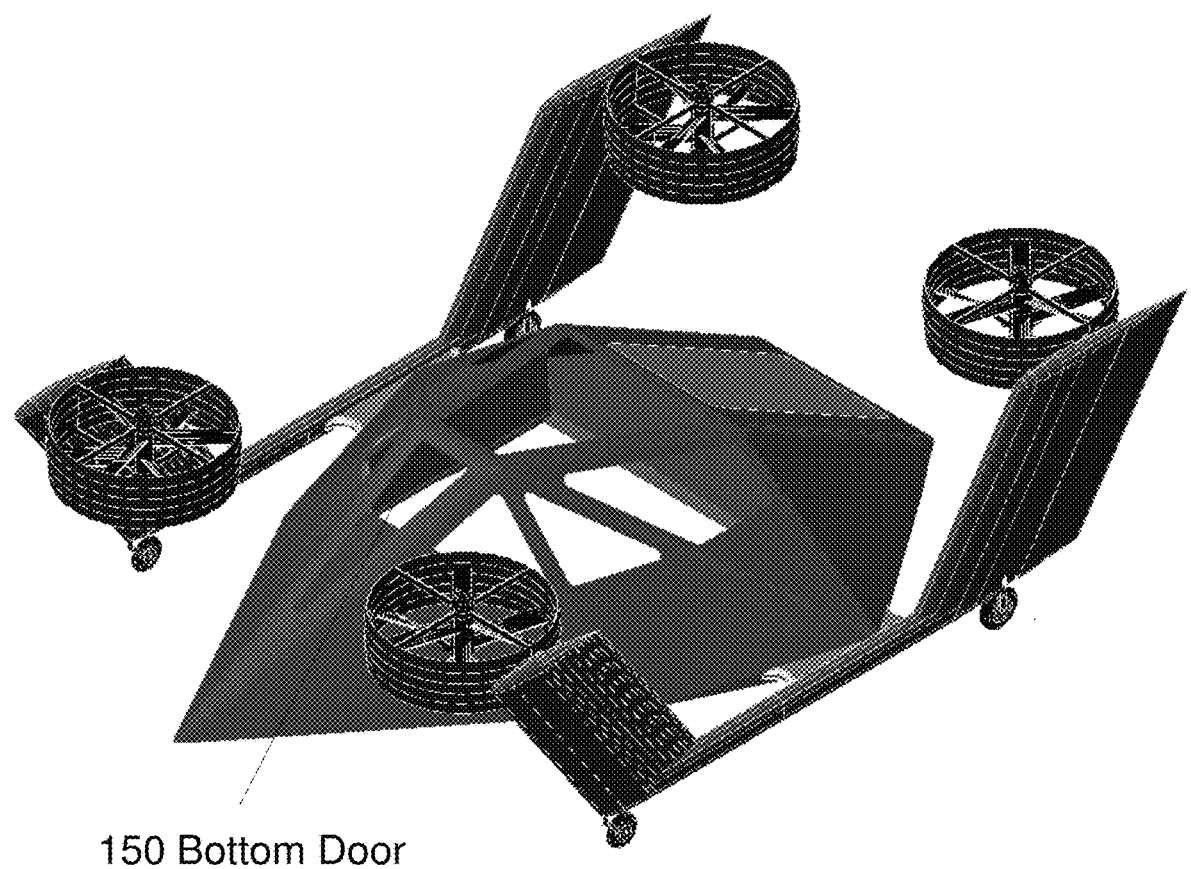
FIG. 6 is a Perspective View of the Diamond Quadcopter with Bottom Door Opened for Maneuvering over Cargo.

In a third embodiment illustrated in FIG. 6, a bottom door 150 is installed in the bottom facet of said diamond faceted fuselage 20 with an opening through said cross structure 70 to allow insertion of cargo and to provide an emergency exit should said ramp 130 become inaccessible or inoperable.

OPERATION—THIRD EMBODIMENT

Utilizing said hub motor 120 or said propulsion module 30, said diamond quadcopter 10 maneuvers over and lowers onto a cargo package through said bottom door 150 using the extension and retraction of said landing struts 90. With no cargo package loaded, or with it released and jettisoned during flight, said bottom door 150 opening may be utilized in manned flights as an emergency egress exit.

DETAILED DESCRIPTION—FOURTH EMBODIMENT

Figure 7:
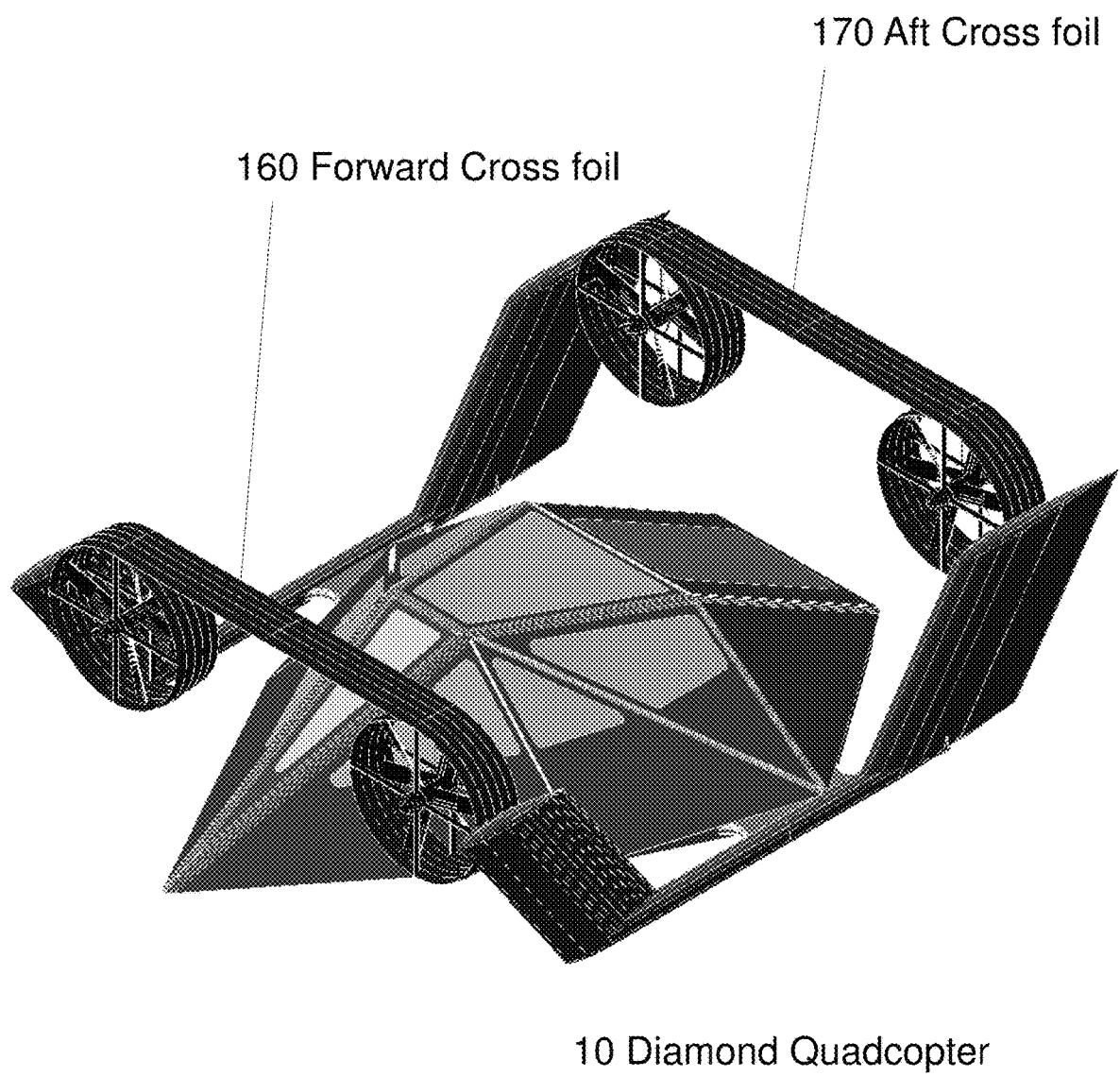
FIG. 7 is a Perspective View of the Diamond Quadcopter with Forward and Aft Cross Foils

In a fourth embodiment illustrated in FIG. 7, a forward cross foil 160 and an aft cross foil 170 are attached to and span between said propulsion modules 30 to provide additional lift while transitioning to and operating in flight mode. Said aft cross foil 170 also provides additional pitch and yaw stability and can, in an embodiment, be applied without said forward cross foil 160. Said forward cross foil 160 is located at a height greater than said diamond faceted fuselage 20; thereby, providing forward visibility if this is a requirement. Said forward cross foil 160 and aft cross foil 170 also provide additional structural stiffness when connected to said propulsion modules 30. Said forward cross foil 160 and aft cross foil 170 may also provide increased lift and induced drag with increased angle of attack during descent.

OPERATION—FOURTH EMBODIMENT

Said rotary actuators 40 control movement of said power modules 30 and said forward cross foil 160 and said aft cross foil 170. Solid spans are illustrated in FIG. 7 and movements are independent forward and aft. In another embodiment, a rotary joint may be installed substantially at span midsection to add fully independent movement for improved flight control.

Summary

This patent describes a diamond quadcopter with a diamond faceted fuselage that generates forward flight lift while providing open corner regions for foil supported propulsion modules that minimize propulsion module slipstream interaction with the fuselage in the different modes of operation. The geometry is scaleable in various embodiments from small size vehicles carrying instruments to mid-sized vehicles carrying packages to large size vehicles carrying cargo and/or people.

Internal to the propulsion module support foils are vertically extendable landing struts with mounted wheels that allow rolling and non-rolling take-offs and landings and provide for maneuverability and control of the height and attitude of the diamond quadcopter while on the ground.

The diamond faceted fuselage has a flat bottom facet allowing the vehicle in one embodiment to settle close to the ground thereby allowing access to the interior via a shallow angled ramp swung open from the lower edge of the aft facet.

The flat bottom facet also allows an embodiment to provides access to the fuselage interior through a bottom door; thereby, allowing the quadcopter to maneuver over and settle onto cargo utilizing height adjustment of the landing struts.

The modes of operation include vertical take-off and landing, conventional short take-off and landing and emergency landings, tilting propulsion during flight, and ground loading and unloading of payload via bottom insertion or via ramp.

The invention claimed is:

1. A diamond quadcopter comprising:
a diamond faceted fuselage, with
tilting propulsion modules mounted on the inboard side of support foils, with
retractable landing struts mounted in said foils with motorized wheels, with
a ramp access and bottom door for loading and unloading, whereby
said tilting propulsion modules provide thrust for lift and flight for vertical/short takeoff and landing as a quadcopter with minimal slipstream interaction with said fuselage, whereby
said ramp provides walk-on or roll-on capabilities for people and cargo, whereby
said motorized wheels allow maneuvering over and then insertion of cargo through said bottom door by extension and retraction of said landing struts.

* * * * *